US012782604B2

(12) United States Patent
Francois et al.

(10) Patent No.: US 12,782,604 B2
(45) Date of Patent: Nov. 3, 2026

(54) FOLDED OPTICAL PATHS INCORPORATING METASURFACES

(71) Applicant: NIL Technology ApS, Kongens Lyngby (DK)

(72) Inventors: Olivier Francois, Naerum (DK); Villads Egede Johansen, Copenhagen (DK); Ulrich Quaade, Bagsvaerd (DK)

(73) Assignee: NIL Technology ApS, Kongens Lyngby (DK)

( * ) Notice: Subject to any disclaimer, the term of this patent is extended or adjusted under 35 U.S.C. 154(b) by 423 days.

(21) Appl. No.: 18/034,956

(22) PCT Filed: Nov. 2, 2021

(86) PCT No.: PCT/EP2021/080390

§ 371 (c)(1),
(2) Date: May 2, 2023

(87) PCT Pub. No.: WO2022/096460

PCT Pub. Date: May 12, 2022

(65) Prior Publication Data

US 2023/0408727 A1 Dec. 21, 2023

Related U.S. Application Data

(60) Provisional application No. 63/109,030, filed on Nov. 3, 2020.

(51) Int. Cl.
*G02B 1/00* (2006.01)
*G02B 5/18* (2006.01)

(52) U.S. Cl.
CPC ........... *G02B 1/002* (2013.01); *G02B 5/1809* (2013.01)

(58) Field of Classification Search
CPC ........ G02B 5/008; G02B 1/002; G02B 1/007; G02B 26/06; G02B 1/005; G02B 5/1809; G02F 1/292; G02F 2202/30
See application file for complete search history.

(56) References Cited

U.S. PATENT DOCUMENTS

| | | | | |
|---|---|---|---|---|
| 7,723,670 | B1 | 5/2010 | Yan et al. | |
| 2002/0036828 | A1* | 3/2002 | Wong | G02B 27/288 359/585 |
| 2017/0030773 | A1 | 2/2017 | Han et al. | |
| 2018/0059223 | A1* | 3/2018 | Jeong | G02B 27/283 |
| 2018/0231702 | A1* | 8/2018 | Lin | G02B 5/1871 |
| 2019/0265486 | A1* | 8/2019 | Hansotte | G02B 6/0016 |
| 2020/0025975 | A1 | 1/2020 | Kamali et al. | |
| 2020/0256725 | A1* | 8/2020 | Han | G01J 3/0256 |

(Continued)

FOREIGN PATENT DOCUMENTS

WO WO 2019/206646 A1 10/2019

OTHER PUBLICATIONS

Chen et al., "A review of metasurfaces: physics and applications," CoRR, submitted on May 25, 2016, arXiv:1605.07672v1, 44 pages.

(Continued)

*Primary Examiner* — Jonathan Y Jung
(74) *Attorney, Agent, or Firm* — Fish & Richardson P.C.

(57) ABSTRACT

An apparatus includes a folded optical path including optically reflective surfaces at least one of which includes an optical metasurface.

21 Claims, 5 Drawing Sheets

(56) References Cited

U.S. PATENT DOCUMENTS

2021/0096453 A1* 4/2021 Wheelwright ..... G02B 17/0856

OTHER PUBLICATIONS

International Search Report and Written Opinion in International Appln. No. PCT/EP2021/080390, mailed on Apr. 12, 2022, 16 pages.

Invitation to Pay Additional Fees in International Appln. No. PCT/EP2021/080390, mailed on Feb. 18, 2022, 10 pages.

International Preliminary Report on Patentability in International Appln. No. PCT/EP2021/080390, mailed on May 19, 2023, 11 pages.

Office Action in Chinese Appln. No. 202180074167.0, mailed on Oct. 21, 2025, 13 pages (with English translation).

Palmer, "The Properties of Diffraction Gratings," Diffraction Grating Handbook, MKS Newport, 2020, Chapter 2, pp. 19-24.

* cited by examiner

FOLDED OPTICAL PATHS INCORPORATING METASURFACES

CROSS-REFERENCE TO RELATED APPLICATIONS

This application is a National Stage Application under 35 U.S.C. § 371 and claims the benefit of International Application No. PCT/EP2021/080390, filed Nov. 2, 2021, which claims priority to U.S. application Ser. No. 63/109,030, filed Nov. 3, 2020, the disclosure of which is incorporated herein by reference.

FIELD OF THE DISCLOSURE

The present disclosure relates to devices having a folded optical path.

BACKGROUND

The path that a light ray follows as it passes through an optical medium or system is often called the optical path. Folded optics allows the beam path to be bent in a way that can make the optical path longer than the size of the system. Thus, for example, the physical length of an optical device can be reduced to less than the length of the optical path by using folded optics.

SUMMARY

The present disclosure describes devices that include a folded optical path incorporating one or more metasurfaces.

For example, in one aspect, the present disclosure describes an apparatus that includes a folded optical path including a plurality of optically reflective surfaces at least one of which includes an optical metasurface.

Some implementations include one or more of the following features. For example, in some implementations, the folded optical path includes at least two optical metasurfaces and in some implementations, the folded optical path includes at least three optical metasurfaces.

In some instances, the optical metasurface is configured to reflect light at an angle different from an angle of the light incident on the optical metasurface. In some instances, the optical metasurface is configured to change a polarization of light incident on the optical metasurface, such that light reflected by the optical metasurface has a polarization different from the polarization of the incident light. In some implementations, the optical metasurface is configured to be selectively transmissive with respect to light having a particular polarization, and selectively reflective with respect to light having a different polarization. In some implementations, the optical metasurface is configured to separate incident light impinging on the metasurface into multiple diffractive orders.

The present disclosure also describes specific examples of arrangements of metasurfaces incorporated into the folded optical path, although other examples are within the scope of the disclosure.

Other aspects, features and advantages will be readily apparent form the following detailed description, the accompanying drawings, and the claims.

DETAILED DESCRIPTION

Advanced optical elements may include a metasurface, which refers to a surface with distributed small structures (e.g., meta-atoms) arranged to interact with light in a particular manner. In general, optical metasurfaces are ultrathin inhomogeneous media with planar structures of meta-atoms that can manipulate the optical properties of light at the subwavelength scale, For example, a metasurface, which also may be referred to as a metastructure, can be a surface with a distributed array of nanostructures. The nanostructures or other meta-atoms may, individually or collectively, interact with light waves so as to change a local amplitude, a local phase, a local polarization, or any combination thereof, of an incident light wave.

In accordance with the present disclosure, devices are described that include a folded optical path incorporating two or more reflective surfaces at least one of which is an optical metasurface.

In some instances, one or more of the metasurfaces interact with the light depending, for example, on the angle of incidence. For example, in some cases, the angle of reflection from the metasurface can differ from the angle of incidence. In some cases, one or more of the metasurfaces is configured to interact with the light in a manner that depends on a property of the incident light, such as the light's polarization. For example, in some instances, one or more of the metasurfaces are configured for polarization conversion (i.e., to change the light's polarization such that the polarization of the light reflected by the metasurface differs from the polarization of the incident light). In some cases, one or more of the metasurfaces are configured to be selectively transmissive with respect to light having a particular polarization, and selectively reflective with respect to light having a different polarization. Some implementations of a folded optical path incorporate one or more metasurfaces that individually or collectively have one or more of the foregoing features.

Figure 1:
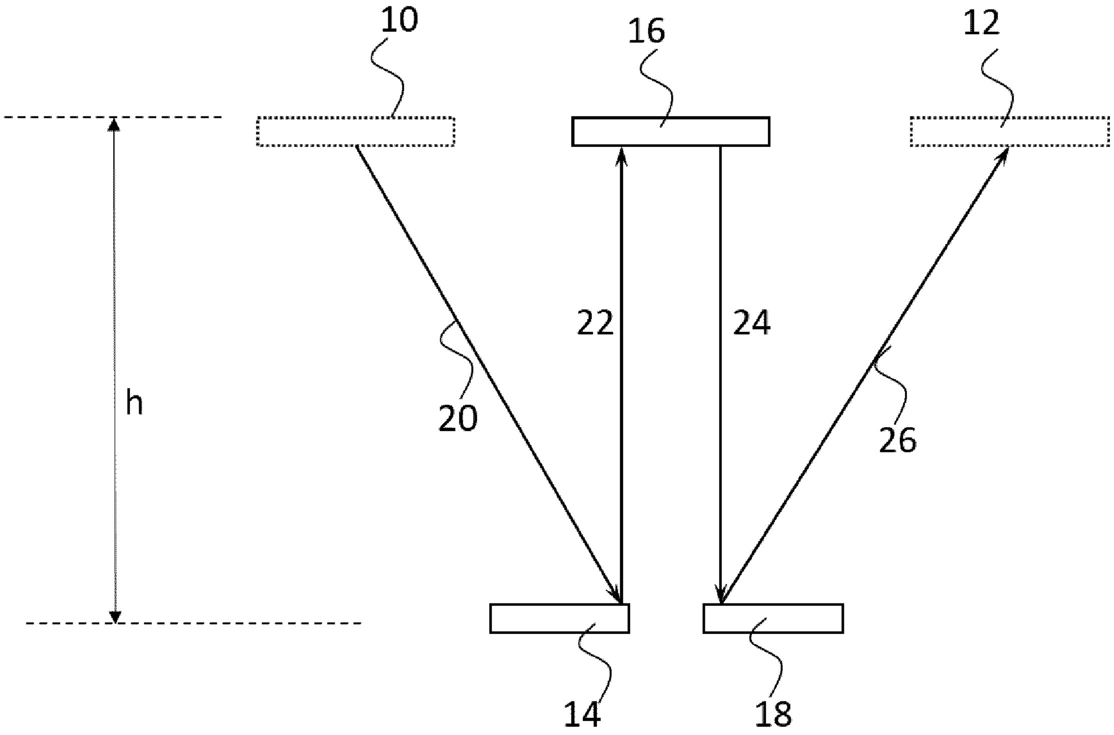
FIG. 1 illustrates a first example of a device that includes a folded optical path incorporating one or more metasurfaces.

FIG. 1 illustrates a first example of an optical or optoelectronic device that includes a light source 10, a light sensor 12, and multiple reflective surfaces 14, 16, 18. In this case, each of the reflective surfaces 14, 16, 18 can be implemented as a respective metasurface. In particular, the first metasurface 14 and the third metasurface 18 are operable to reflect light at an angle different from the respective angle of incidence on the metasurface. In the illustrated example, this effect can be used to help reduce the overall height (h) of the device while increasing its total track length (TTL) and reducing its footprint.

In FIG. 1, light 20 produced by the light source 10 and incident on the first metasurface 14 is reflected as light 22 traveling toward the second metasurface 16. In some instances, the light 20 incident on the first metasurface 14 is light reflected from one or more objects external to the device, rather than light produced by a separate light source 10. This may be the case, for example, in structured light three-dimensional applications. The light 20 then is reflected from the first metasurface 14 at an angle different from the angle of incidence on the first metasurface. In the example of FIG. 1, the light reflected by the first metasurface 14 is indicated by 22. Light 24 reflected from the second metasurface 16 is incident on the third metasurface 18 and then is reflected by the third metasurface 18 at an angle different from the angle of incidence on the third metasurface. The light 26 reflected from the third metasurface 18 is indicated by 26. In the illustrated example, the third metasurface 18 differs from the first metasurface 14 so that the light reflected by each surface (i.e., 22 or 24) is reflected by a different amount with respect to the light incident on the surface. The light 26 reflected from the third metasurface 18 is directed toward the light sensor 12, which is operable to detect one or more properties of the incident light 26.

Figure 2:
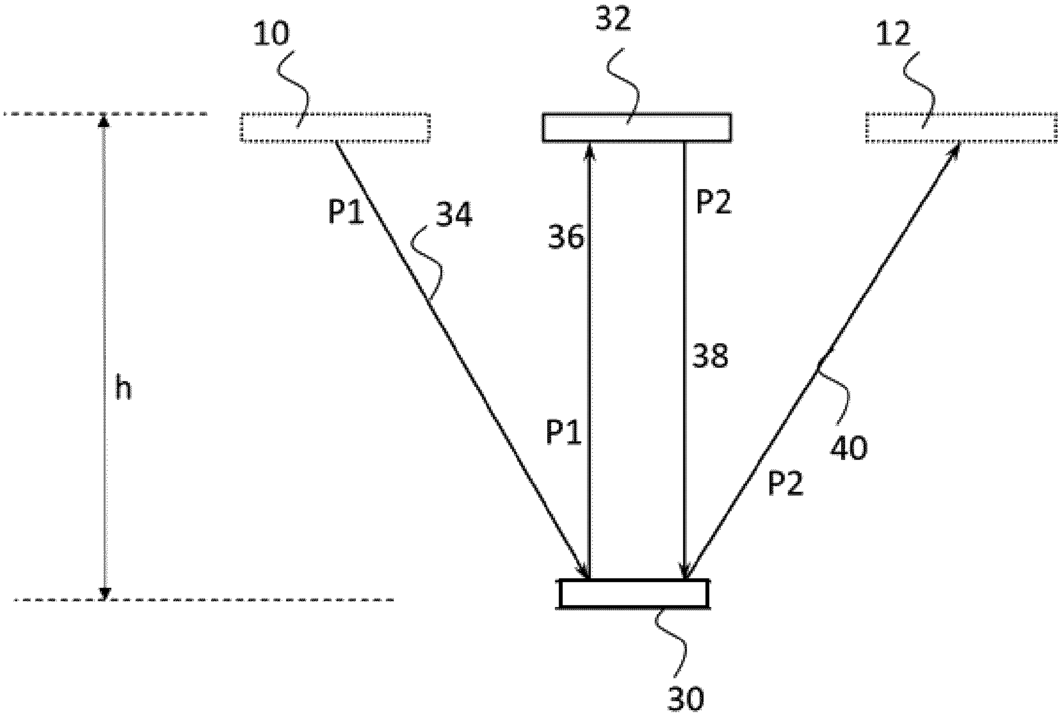
FIG. 2 illustrates a second example of a device that includes a folded optical path incorporating one or more metasurfaces.

In some implementations, as shown in the example of FIG. 2, the functionality of the first and third metasurfaces 14, 18 can be combined into a single metasurface. The first metasurface 30 in this example is configured to reflect light of a first polarization P1 differently from light having a second different polarization P2. In this instance, the light source 10 is operable to produce light 34 having the first polarization P1. The light 34 incident on the first metasurface 30 is reflected (at a particular angle) by the first metasurface toward a second metasurface 32, which is configured to change the polarization of the incident light 36 (i.e., from P1 to P2) and direct reflected light 38 having the second polarization P2 back toward the first metasurface 30. The light 38 that has the second polarization P2 and that is incident on the first metasurface 30 is reflected from the first metasurface 30 at a different angle than the light 34 having the first polarization P1. The light 40 reflected from the third metasurface 30 is directed toward a light sensor 12, which is operable to detect one or more properties of the incident light 40.

The implementation of FIG. 2 can facilitate production of a device having a folded optical path similar to the example of FIG. 1, but using fewer reflective surfaces. Reducing the number of surfaces needed can be advantageous, for example, to achieve a highly compact design. Further, in some instances, fewer surfaces can result in fewer steps (e.g., alignment steps) being required during manufacturing.

Figure 3:
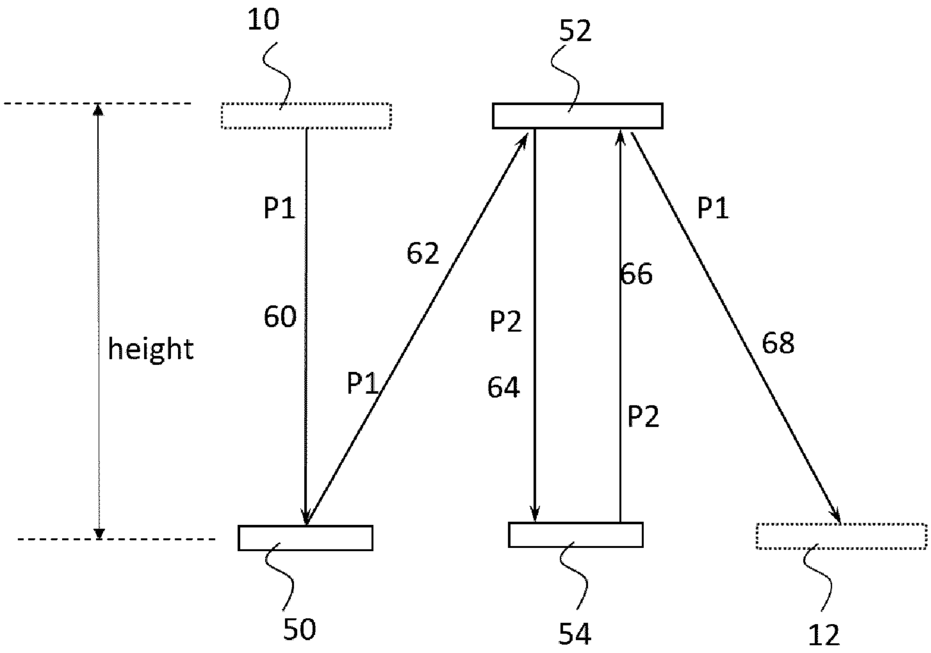
FIG. 3 illustrates a third example of a device that includes a folded optical path incorporating one or more metasurfaces.

FIG. 3 illustrates a further example, which like the implementation of FIG. 1 incorporates three reflective surfaces, but which has a longer TTL. In FIG. 3, light 60 produced by the light source 10 has a first polarization (P1) and is incident on a first metasurface 50. The incident light 60 is reflected from the first metasurface at an angle different from the angle of incidence on the first metasurface. The light 62 reflected from the first metasurface 50 travels toward a second metasurface 52, which is configured to change the polarization of the incident light 62 (i.e., from P1 to P2). The reflected light 64 having the second polarization P2 travels toward the third metasurface 54. The light 64 incident on the third metasurface 54 is reflected back toward the second metasurface 52 as light 66 having the second polarization P2. The second metasurface 52 then changes the polarization of the incident light 66 (from P2 to P1) such that light 68 is reflected from the second metasurface 52 at an angle different from the angle of incidence. The light 68 that is reflected from the second metasurface 52 and that has the first polarization P1 is directed toward a light sensor 12, which is operable to detect one or more properties of the incident light 68.

Figure 4:
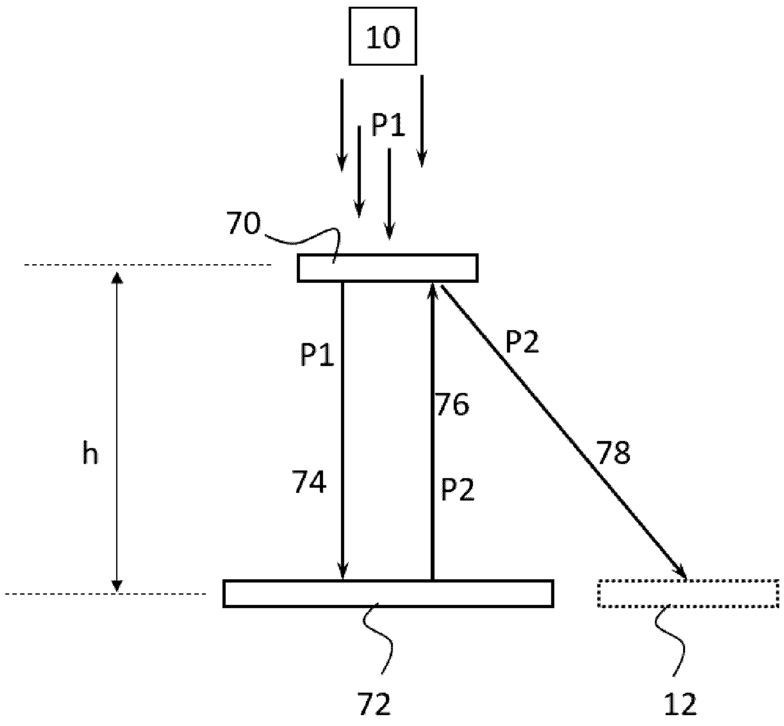
FIG. 4 illustrates a fourth example of a device that includes a folded optical path incorporating one or more metasurfaces.

As shown in the example of FIG. 4, some implementations include a folded optical path including at least one metasurface that is transparent to light with a first polarization P1 and reflective to light with a second polarization P2. FIG. 4 illustrates an example that includes two metasurfaces 70, 72. The first metasurface 70 is configured to be transparent to light having the first polarization P1 and reflective to light having the second polarization P2. The second surface 72 is configured to change the polarization of the incident light 74 (e.g., from P1 to P2) and to reflect it back as light 76 toward the first metasurface. The light 76 that has the second polarization P2 and that is incident on the first metasurface 70 is reflected (as light 78) from the first surface 70 (rather than being transmitted by the first metasurface). The reflected light 78 travels toward the light sensor 12, which is operable to detect one or more properties of the incident light 78.

Figure 5:
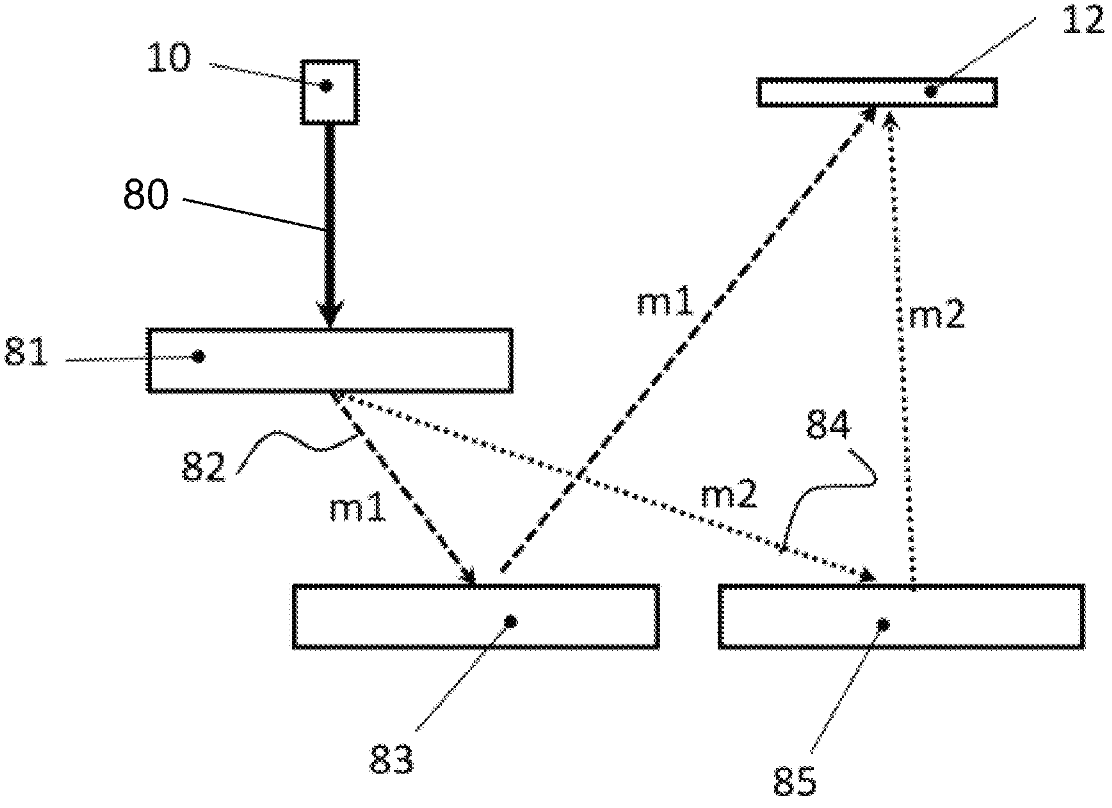
FIG. 5 illustrates a fifth example of a device that includes a folded optical path incorporating one or more metasurfaces.

In some implementations, as shown in FIG. 5, light incident 80 on a first metasurface 81 is separated into multiple different diffractive orders. For example, as illustrated in FIG. 5, the incident light 80 is separated into two diffractive orders, m1, m2. As mentioned above, in some instances, the incident light 80 is produced by a light source 10, whereas in other instances, the incident light may be light reflected from one or more external objects. In the illustrated example, upon passing through the first metasurface 81, light 82 of the first order m1 is directed to a second metasurface 83, whereas light 84 of the second order m2 is directed to a third metasurface 85. The second metasurface 83 is configured to direct the light of the first order m1 onto the sensor 12, and the third metasurface 85 is configured to direct the light of the second order m2 onto the sensor 12.

Figure 6A:
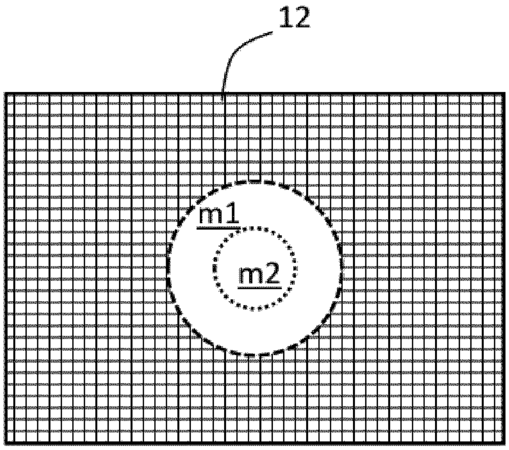
FIGS. 6A and 6B illustrate examples of different diffractive orders of light incident on an optical sensor.
Figure 6B:
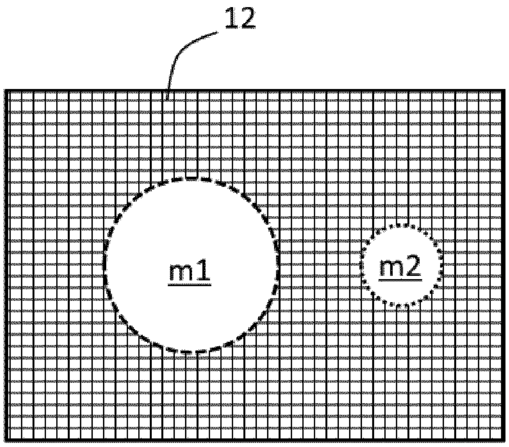

In some instances, light corresponding to the two diffractive orders m1, m2 may be focused on the same area of the sensor 12 such that they overlap one another (see FIG. 6A), whereas in other instances, the light corresponding to the two diffractive orders m1, m2 may be focused on different areas of the sensor 12 such that they do not overlap (see FIG. 6B). When both orders m1, m2 are focused on the same area of the sensor such that the orders are recombined, improved efficiency may be realized in some implementations (e.g., structured light applications where dots are projected onto one or more objects in a scene). In such cases, the optical dots incident on the sensor 12 can have higher intensity when combined. On the other hand, the configuration of FIG. 6B can, in some instances, provide additional functionality. For example, two different magnifications of the same area (corresponding, respectively, to the diffractive orders m1 and m2) can be achieved on the same sensor surface. Thus, the configuration of FIG. 6B may be useful, for example, in imaging applications where images of the same scene at two different magnifications are obtained.

In the foregoing examples of FIGS. 1 through 5, one or more of the metasurfaces may modify the light in other ways as well. For example, at least some of the surfaces may be configured to perform optical aberration correction. In some instances, the surfaces may be configured to perform other optical functions, such as collimating the incident light.

Further, in some instances, one or more of the metasurfaces may be implemented by a reflective surface other than a metasurface. For example, in FIG. 2, the second surface 32 can be a specially configured mirror rather than a metasurface.

In some implementations, the light source 10 can be, or include, for example, a polarized light source (e.g., a VCSEL or other laser) or a non-polarized light source. The light source 10 may include additional optical elements (e.g., polarization selective filters) to generate polarized incident light. Depending on the implementation, the light can be or include, for example, infra-red (IR) or visible radiation. In some implementations, the light sensor 12 can be or include, for example, a photodiode, or a CMOS or CCD image sensor.

Figure 7:
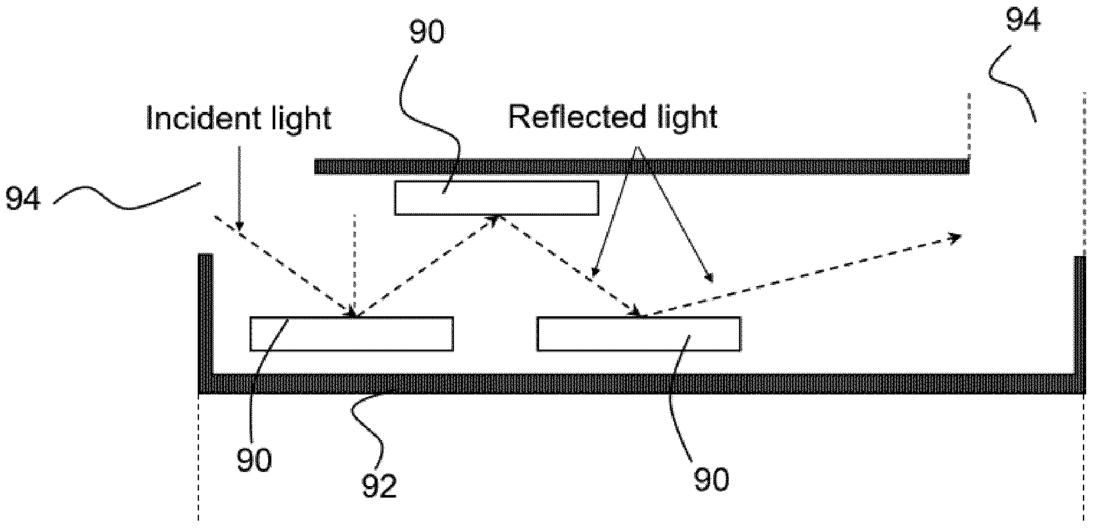
FIG. 7 illustrates an example of a folded light path including metasurfaces disposed within a housing.

As shown in FIG. 7, in some implementations, the folded optical path, including one or more metasurfaces 90 such as those described above, is contained within a housing 82. In some cases, the housing 92 may include one or more openings 94 for light to enter or exit. In some instances, a light source 10 and/or light sensor 12 also is mounted within the housing 92. In other implementations, one or both of the light source 10 and/or light sensor 12 may be disposed outside the housing 92. Thus, in some instances, a light source 10 and/or light sensor 12 may be integrated as part of the same device that includes the folded optical path; in other instances, a light source 10 and/or light sensor 12 may be separate from the optical component that includes the folded optical path.

Devices or systems having a folded optical path as described in this disclosure may be integrated, for example, into a wide range of consumer or other electronics, such as mobile phones, laptops, televisions, wearable devices, or automotive vehicles, as well as others.

Various modifications may be made within the spirit of this disclosure. Some implementations may incorporate features described above in connection with different examples. Accordingly, other implementations also are within the scope of the claims.

What is claimed is:

1. An apparatus comprising:

a folded optical path including a plurality of optically reflective surfaces at least one of which includes an optical metasurface, wherein the plurality of optically reflective surfaces includes first and second optically reflective surfaces, wherein the first reflective surface is configured to reflect light, which has a first polarization and which is incident on the first reflective surface, toward the second reflective surface, wherein the light reflected from the first reflective surface is reflected at an angle different from an angle of the incident light, the second reflective surface is configured to change a polarization of the light that is incident on the second reflective surface from the first polarization to a second different polarization, and to reflect the light having the second polarization toward the first reflective surface, the first reflective surface is configured to reflect the light which has the second polarization and which is incident on the first reflective surface, at an angle that differs from an incident angle of the light that has the second polarization and that is incident on the first reflective surface, and at least one of the first or second reflective surfaces comprises the optical metasurface.

2. The apparatus of claim 1 wherein the folded optical path includes at least two optical metasurfaces.

3. The apparatus of claim 1 wherein the folded optical path includes at least three optical metasurfaces.

4. The apparatus of claim 1 wherein the optical metasurface is configured to reflect light at an angle different from an angle of the light incident on the optical metasurface.

5. The apparatus of claim 1 wherein the optical metasurface is configured to change a polarization of light incident on the optical metasurface, such that light reflected by the optical metasurface has a polarization different from the polarization of the incident light.

6. The apparatus of claim 1 wherein the optical metasurface is configured to be selectively transmissive with respect to light having a particular polarization, and selectively reflective with respect to light having a different polarization.

7. The apparatus of claim 1 wherein the optical metasurface is configured to separate incident light impinging on the metasurface into multiple diffractive orders.

8. The apparatus of claim 1 wherein the plurality of optically reflective surfaces includes a third optically reflective surface, wherein:

the third reflective surface is configured to reflect light, which is incident on the third reflective surface, at an angle that differs from an angle of the light incident on the third reflective surface, and the third reflective surfaces comprises an additional optical metasurface.

9. The apparatus of claim 8 wherein each of the first, second and third reflective surfaces comprises a respective optical metasurface.

10. The apparatus of claim 8 wherein the first and third reflective surfaces differ from one another such that light, which is incident on the first reflective surface, is reflected by the first reflective surface at a first angle, and light incident on the third reflective surface is reflected by the third reflective surface at a second angle different from the first angle.

11. The apparatus of claim 1, wherein each of the first and second reflective surfaces comprises a respective optical metasurface.

12. The apparatus of claim 1, wherein the second reflective surface is configured to reflect the light that has the first polarization, and that is incident on the second reflective surface, at an angle that differs from an angle of the light that has the second polarization and that is incident on the second reflective surface.

13. The apparatus of claim 1 wherein:

the optical metasurface is configured to separate incident light into different diffractive orders.

14. The apparatus of claim 13 wherein each of the first and second reflective surfaces comprises a respective optical metasurface.

15. The apparatus of claim 13, further comprising an optical sensor, wherein the first reflective surface is configured to direct light of a first diffractive order toward the sensor.

16. The apparatus of claim 15 wherein the light of the first diffractive order and light of a second diffractive order impinge a same area of the sensor so as to overlap one another at least partially.

17. The apparatus of claim 15 wherein the light of the first diffractive order and light of a second diffractive order impinge a different areas of the sensor so as not to overlap one another.

18. The apparatus of claim 1 including a light source operable to produce a light beam incident on a first one of the reflective surfaces in the folded optical path.

19. The apparatus of claim 18 wherein the light source is operable to produce polarized light.

20. The apparatus of claim 1 including a light sensor operable to detect light reflected by at least one of the reflective surfaces in the folded optical path.

21. An apparatus comprising:

a folded optical path including a plurality of optically reflective surfaces at least one of which includes an optical metasurface, wherein the plurality of optically reflective surfaces includes a first optically reflective surface, a second optically reflective surface and a third optically reflective surface, wherein the first optically reflective surface is configured to reflect light, which has a first polarization and which is incident on the first optically reflective surface, toward the second optically reflective surface, wherein the light reflected from the first optically reflective surface is reflected at an angle different from an angle of the incident light, the second optically reflective surface is configured to change a polarization of the light that has the first polarization, and that is incident on the second optically reflective surface, from the first polarization to a second different polarization, and to reflect the light having the second polarization toward the third optically reflective surface, the third optically reflective surface is configured to reflect the light that has the second polarization, and that is incident on the third optically reflective surface, toward the second optically reflective surface, the second optically reflective surface is further configured to change a polarization of the light that has the second polarization, and that is incident on the second optically reflective surface, from the second polarization to the first different polarization, and to reflect the light having the first polarization, and at least one of the first optically reflective surface, the second optically reflective surface or the third optically reflective surface comprises the optical metasurface.

* * * * *